US010823629B2

(12) United States Patent
Escapita Flores et al.

(10) Patent No.: US 10,823,629 B2
(45) Date of Patent: Nov. 3, 2020

(54) SYSTEM AND METHOD FOR MONITORING FASTENER TENSION

(71) Applicant: General Electric Company, Schenectady, NY (US)

(72) Inventors: Miguel Angel Escapita Flores, Queretaro (MX); Alejandro Torres Bahena, Queretaro (MX)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 15/951,320

(22) Filed: Apr. 12, 2018

(65) Prior Publication Data

US 2019/0316978 A1 Oct. 17, 2019

(51) Int. Cl.
*G01L 5/24* (2006.01)
*G01L 1/16* (2006.01)

(52) U.S. Cl.
CPC ............... *G01L 5/243* (2013.01); *G01L 1/16* (2013.01)

(58) Field of Classification Search
CPC . G01L 5/243; G01L 1/16; G01L 1/148; G01L 1/247; G01L 25/003; G01L 9/0042; G01L 9/0054; G01L 3/1464; G01H 13/00; G01H 17/00; G01H 15/00; G01H 1/00; G01H 5/00; G01N 29/11; G01N 29/12; G01N 29/00; G01N 29/032; G01N 2291/0231; B01D 49/006; G01M 7/00; G01M 99/007; G01M 5/0033; A61B 5/0048
See application file for complete search history.

(56) References Cited

U.S. PATENT DOCUMENTS

| 6,250,863 | B1 | 6/2001 | Kamentser |
| 6,378,384 | B1 | 4/2002 | Atkinson |
| 7,073,390 | B2 | 7/2006 | Luthje |
| 7,289,033 | B2 | 10/2007 | Hockersmith |
| 7,698,949 | B2 | 4/2010 | Akdeniz |
| 8,226,354 | B2 | 7/2012 | Nies |
| 8,591,187 | B2 | 11/2013 | Bagepalli |
| 8,898,991 | B2 | 12/2014 | Cai |
| 9,429,485 | B1 | 8/2016 | Cavallaro |
| 9,645,061 | B2 | 5/2017 | Hsieh |
| 2006/0225511 | A1 | 10/2006 | Burmann |
| 2017/0175792 | A1 | 6/2017 | Jaffrey |

FOREIGN PATENT DOCUMENTS

| WO | 2014063773 A1 | 5/2014 |
| WO | 2015007267 A3 | 1/2015 |

*Primary Examiner* — Harshad R Patel
*Assistant Examiner* — Nigel H Plumb
(74) *Attorney, Agent, or Firm* — Dority & Manning, P.A.

(57) ABSTRACT

A system for monitoring fastener tension includes a fastener clamping a first member to a second member. A load monitoring sensor is interposed between a nut and the second member, and outputs an electrical signal upon changes in fastener tension. A signal collection hub is connected to the load monitoring sensor so that the electrical signal is transmitted from the load monitoring sensor to the signal collection hub. The signal collection hub collects and converts electrical signals into a data package. A processor transforms the data package into a digital representation of mechanical data. The mechanical data is compared to a predetermined mechanical limit value by the processor. If a value of the mechanical data is equal to or less than the predetermined mechanical limit value then an indication is generated to indicate that the fastener should be serviced.

19 Claims, 5 Drawing Sheets

SYSTEM AND METHOD FOR MONITORING FASTENER TENSION

BACKGROUND OF THE INVENTION

The apparatus described herein relates generally to a system and method for monitoring fastener tension and, more particularly, to a system and method for monitoring fastener tension in wind turbines and wind turbine foundations or towers.

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

The tower typically includes a base section and one or more upper sections. The base section of the tower is secured to a foundation. The foundation may be a concrete slab (raft) foundation, a short pole type foundation, a deep piling foundation, offshore foundation or any other suitable foundation capable of supporting loads produced by wind, turbine operation, and gravitational forces with usage of an anchor cage. A typical interface between the tower base portion and an anchor cage foundation has a bottom T-flange attached to a tower base adapter or a door section.

Fasteners are used in many locations throughout the wind turbine, and the foundation is just one example. Fasteners are also used in the blades, hub and nacelle. Any fastener needs to be correctly tensioned to function properly. If the tension on a specific fastener decreases below a desired amount, then larger stresses are applied to the fastener. If the stresses exceed a certain level, then the fastener could have its integrity compromised. Accordingly, a system and method for monitoring fastener tension, especially in remotely located applications, would be desired in the art.

BRIEF DESCRIPTION OF THE INVENTION

In an aspect of the disclosure, a system for monitoring fastener tension includes a fastener clamping a first member to a second member. The fastener includes a nut proximate to the second member and a washer interposed between the nut and the second member. A load monitoring sensor is interposed between the nut and the second member, and the load monitoring sensor outputs an electrical signal upon changes in fastener tension. A signal collection hub is operatively connected to the load monitoring sensor so that the electrical signal is transmitted from the load monitoring sensor to the signal collection hub. The signal collection hub collects and converts one or more electrical signals into a data package. A processor is operatively connected to the signal collection hub so that the data package is transmitted from the signal collection hub to the processor, and the processor transforms the data package into a digital representation of mechanical data. The mechanical data is compared to a predetermined mechanical limit value by the processor, and if a value of the mechanical data is equal to or less than the predetermined mechanical limit value then an indication is generated to indicate that the fastener should be serviced.

In another aspect of the disclosure, a method for monitoring fastener tension is provided. A fastener clamps a first member to a second member, and the fastener includes a nut proximate to the second member and a washer interposed between the nut and the second member. The method includes an obtaining step for obtaining one or more signals from one or more load monitoring sensors. Each of the load monitoring sensors are interposed between the nut and the second member, and each of the load monitoring sensors outputs a signal upon changes in fastener tension. A transmitting step transmits the one or more signals to a signal collection hub. A collecting step collects the one or more signals in the signal collection hub. A converting step converts the one or more signals into a data package, and a transmitting step transmits the data package to a processor. A converting step converts the one or more signals with the processor into mechanical data values. A comparing step compares the mechanical data values to a predetermined mechanical limit value. A generating step generates an indication if a value of the mechanical data values is equal to or less than the predetermined mechanical limit value, the indication is a notification that the fastener should be serviced.

In yet another aspect of the disclosure, a method for monitoring fastener tension in a wind turbine is provided. A fastener clamps a bolted joint of the wind turbine. An obtaining step obtains one or more signals from one or more load monitoring sensors. Each of the load monitoring sensors are placed around a portion of the fastener, and each of the load monitoring sensors outputs a signal upon changes in fastener tension. A transmitting step transmits the one or more signals to a signal collection hub, and a converting step converts the one or more signals into a data package. Another transmitting step transmits the data package to a processor, and another converting step converts the one or more signals with the processor into mechanical data values. A comparing step compares the mechanical data values to a predetermined mechanical limit value. A generating step generates an indication if a value of the mechanical data values is equal to or less than the predetermined mechanical limit value, the indication is a notification that the fastener should be serviced.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
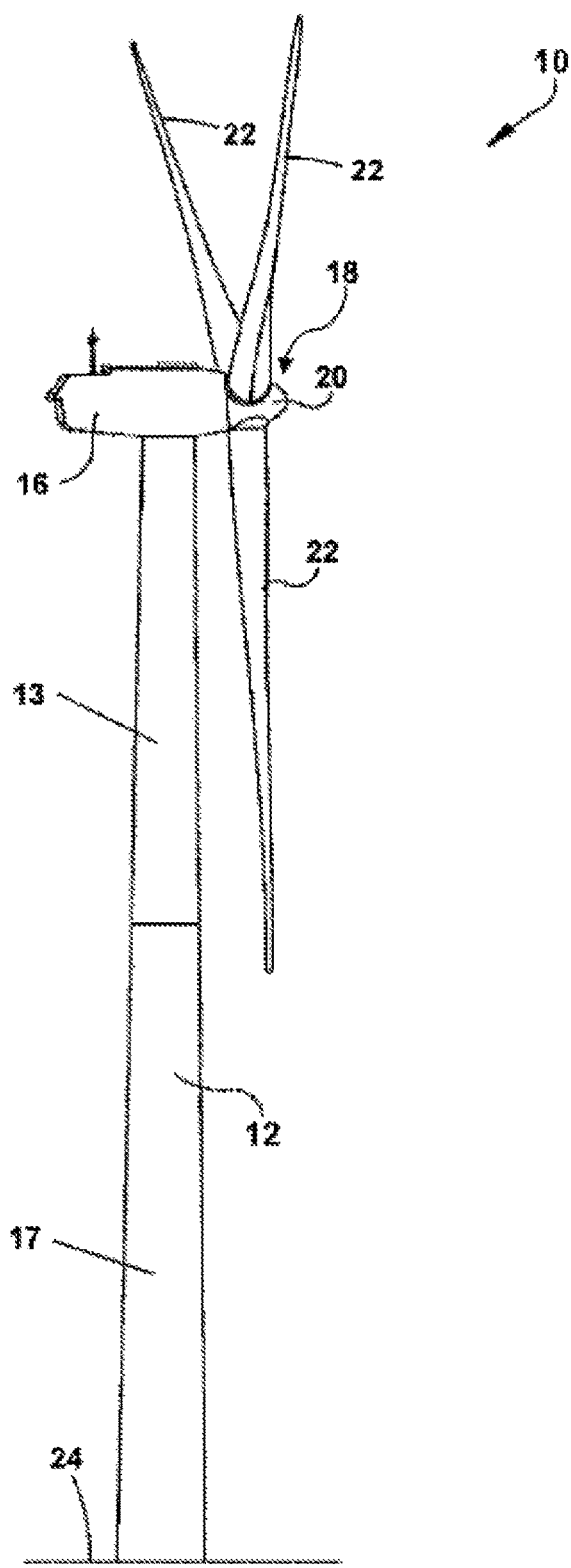
FIG. 1 illustrates a side view of one known wind turbine.

Referring to the drawings, FIG. 1 illustrates a side view of one known wind turbine 10. As shown, the wind turbine 10 includes a tower 12 extending from a foundation 24, a nacelle 16 mounted on the tower 12, and a rotor 18 coupled to the nacelle 16. The tower 12 includes a base section 17 and one or more upper sections 13. The rotor 18 includes a rotatable hub 20 and at least one rotor blade 22 coupled to and extending outwardly from the hub 20. For example, in FIG. 1, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy.

Figure 2:
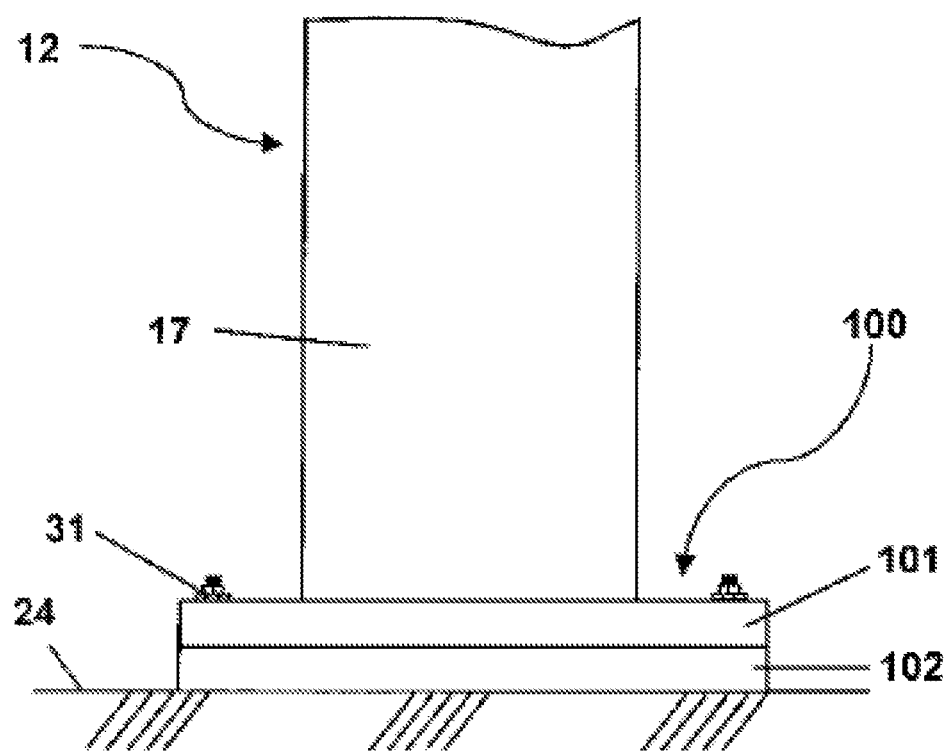
FIG. 2 illustrates an elevation view of one known tower base ring assembly secured between a wind turbine tower and a foundation.

As shown in FIG. 2, a simplified view of the base section 17 of the tower 12 secured to a foundation 24 by a tower base ring assembly 100 is illustrated. The tower base ring assembly 100 includes a detachable top ring 101 and a detachable bottom ring 102. The base section 17 of the tower 12 is secured to the tower base ring assembly 100 by connect bolts (not shown). The tower base ring assembly 100 is secured to the foundation 24 by anchor bolts 31. Anchor bolts 31 may be located outside of the tower (as shown), inside the tower, or both.

Figure 3:
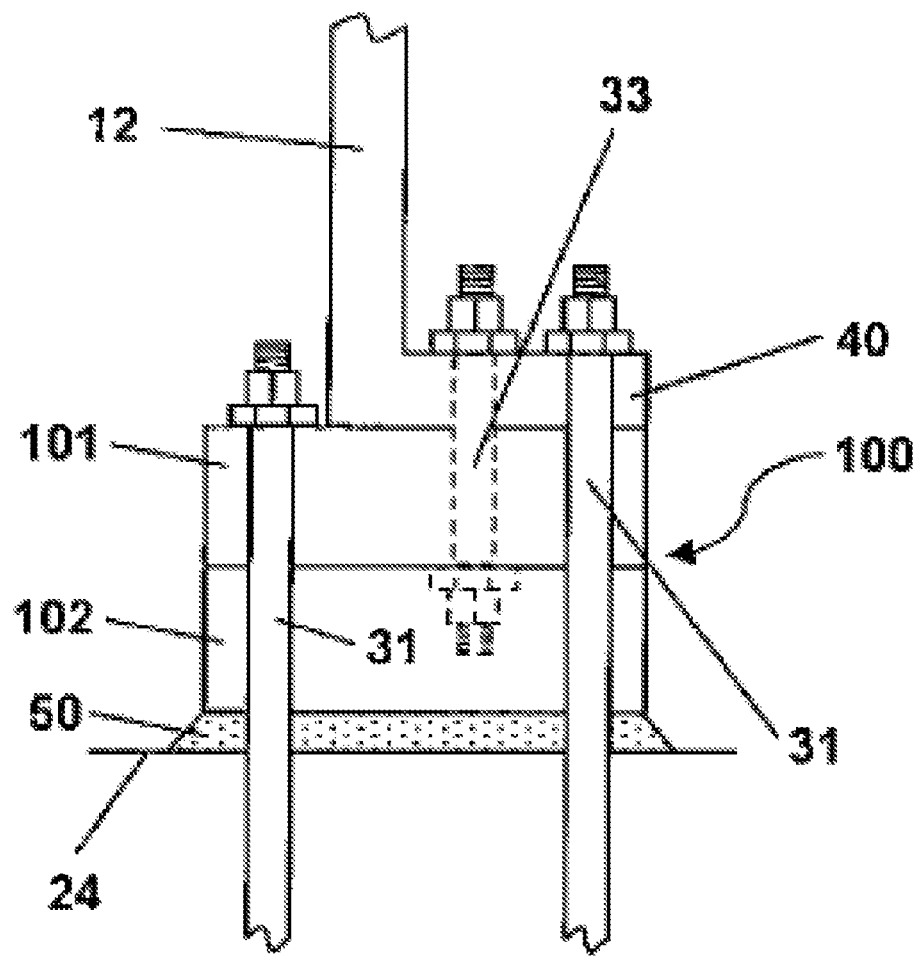
FIG. 3 illustrates a cross-sectional view of the region where the tower connected to the foundation.

FIG. 3 illustrates a cross-sectional view of the region where the tower is connected to the foundation. The top ring 101 may be secured to the tower 12 by any appropriate means. For example, the top ring 101 may be bolted to a tower L-flange 40 by connection bolts 33 (i.e., fasteners). Further, as illustrated, the assembled tower bottom L-flange 40, the top ring 101, and the bottom ring 102 may be connected to the foundation 24 with anchor bolts 31. The anchor bolts 31 may be located inside the tower 12 and/or outside of the tower 12, as particularly illustrated in FIG. 3. A grout material 50 may be provided to deliver further support between the tower base ring assembly 100 and the foundation 24. The presently described embodiment will focus on tower foundation connection fasteners, but it is to be understood that any fastener in the wind turbine can benefit from the system and method herein described. Furthermore, the fasteners 31 and 33 comprise elements of a bolted joint, and these bolted joints may occur anywhere in the wind turbine where two or more elements need to be clamped or secured together (e.g., in the rotor, wind turbine blades, nacelle or tower).

Figure 4:
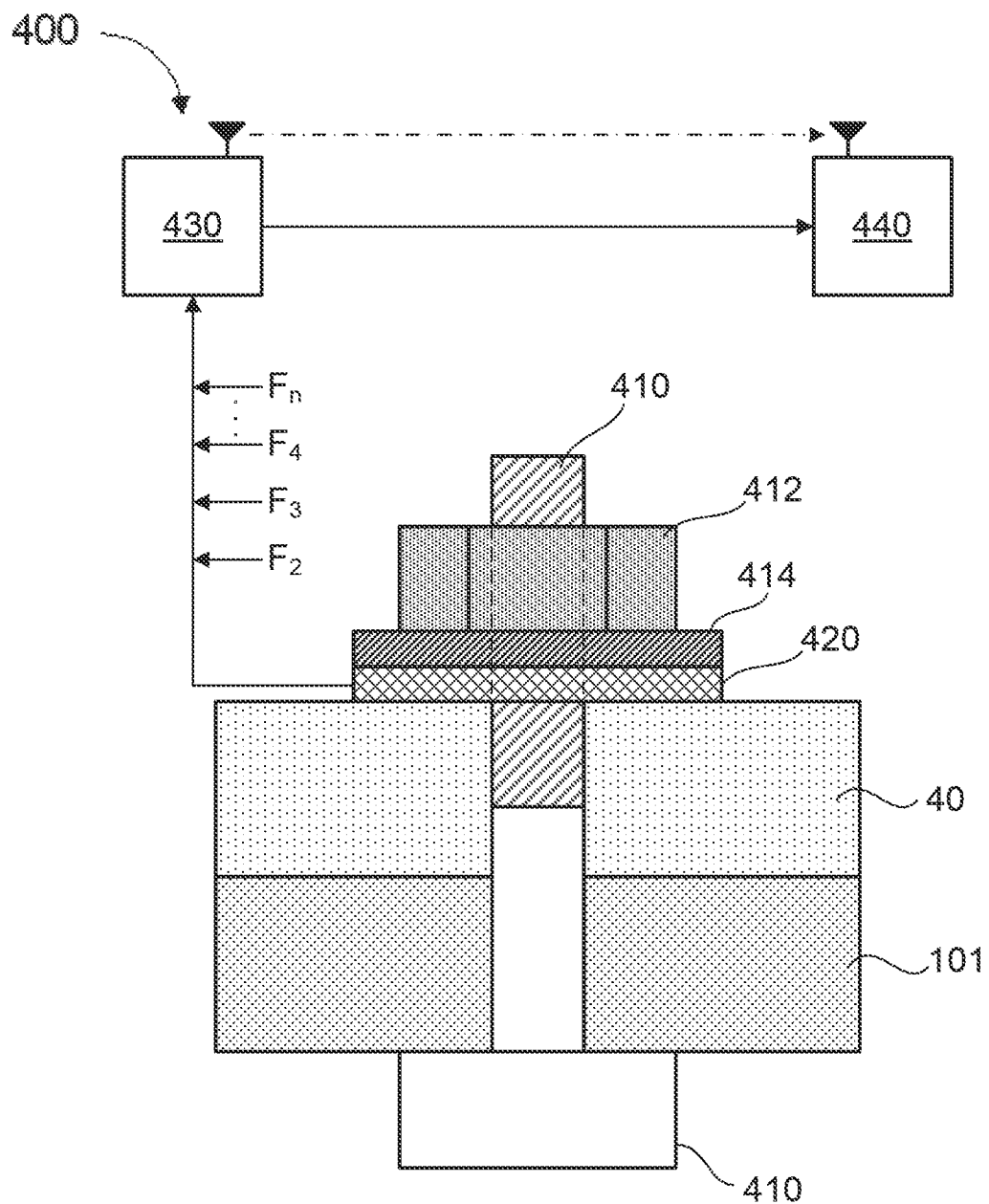
FIG. 4 illustrates a simplified schematic of a system for monitoring fastener tension, according to an aspect of the present disclosure.

FIG. 4 illustrates a simplified schematic of a system 400 for monitoring fastener tension, according to an aspect of the present disclosure. A fastener 410 clamps two members 40, 101 together. For example, a first member may be the top ring 101, and the second member may be the tower L-flange 40. The fastener 410 may be a bolt or any other suitable type of fastener to clamp the two members together. A nut 412 and washer 414 are used on one end of the fastener to tension the fastener 410. A load monitoring sensor 420 is interposed between the washer 414 and the tower L-flange 40. The load monitoring sensor 420 outputs an electrical signal upon changes in fastener tension, and may be a piezoelectric sensor/washer. For example, when using a piezoelectric device for the load monitoring sensor 420, an electrical signal (e.g., voltage) will be output by the piezoelectric device upon changes in pressure experienced by the piezoelectric device. As tension on the fastener 410 (and pressure on the load monitoring sensor 420) increases, a positive voltage will be output by sensor 420. Conversely, as tension on the fastener 410 (and pressure on the load monitoring sensor 420) decreases, negative voltage will be output by sensor 420. This voltage level can be correlated to fastener tension, and specifically to desired fastener tension levels or values.

A signal collection hub 430 is operatively connected to the load monitoring sensor 420 so that the electrical signal generating during load change events is transmitted from the load monitoring sensor 420 to the signal collection hub 430. Typically, many fasteners 410 ($F_1$-$F_n$) are used in a wind turbine. In a foundation example, the fasteners 410 are located circumferentially around the mounting flange of the foundation or base tower section. In the example shown, $F_1$ would be the fastener 410 shown, and the remaining foundation fasteners are schematically shown as $F_2$ to $F_n$. Each of these fasteners may incorporate a load monitoring sensor 420, and each load monitoring sensor is connected to the signal collection hub. In this manner, multiple fasteners can be constantly monitored for any changes in tension. The load monitoring sensors 420 can be connected to the signal collection hub via a wired link or wirelessly, depending on the specific application. Each load monitoring sensor 420 may incorporate a radio frequency identification device that uniquely identifies the fastener to which it is associated, and to provide wireless communication capability. The signal collection hub 430 collects and converts one or more electrical signals into a data package, and then transmits this data package to a processor 440 or computing device. The transmission may occur via a wired or wireless link, both of which are shown in FIG. 4. In addition, multiple fasteners may be monitored and the multiple fasteners can be separated into groups. Each group of fasteners has a different predetermined mechanical limit value. One group may be tower foundation fasteners, a second group may be tower section fasteners, a third group may be blade to hub connection fasteners, and a fourth group may be fasteners located inside the nacelle. The different groups will have different tension requirements for their respective fasteners, and the system and method described herein may be used to track the real-time tension values of many different fasteners simultaneously.

The processor 440 is operatively connected to the signal collection hub 430 so that the data package may be transmitted from the signal collection hub 430 to the processor 440, as described above. The processor 440 transforms the electrical signals of the data package into a digital representation of mechanical data (e.g., force or strain data values) for the sensed fastener (or no sensed fasteners). The processor could be programmed to calculate stress/strain values for non-sensed fasteners using information available from sensed fasteners. The mechanical data is compared to a predetermined mechanical limit value by the processor, and if a value of the mechanical data is equal to or less than the predetermined mechanical limit value then an indication is generated to indicate that the fastener should be serviced. For example, if the tension of a specific fastener decreases due to a loosening nut, then the resultant tension decrease will be detected, sent to signal collection hub 430, transferred to processor 440, analyzed and if the tension decrease is calculated to exceed a threshold then a notification or alarm is generated to notify service or monitoring personnel. The predetermined mechanical limit may be the same or different for different fasteners, and fasteners may be arranged in groups having the same predetermined mechanical limit values. For example, tower foundation fasteners may have a first predetermined mechanical limit value, tower section fasteners (i.e., fasteners joining one tower section to an adjoining tower section or vertical joints in a tower section) may have a second predetermined mechanical limit and fasteners joining the blades to the hub may have a third predetermined mechanical limit, where the first, second and third predetermined mechanical limit values are different from each other. The system and method herein described can monitor and track the tension values for a variety of fasteners located in different parts of the wind turbine, or any machine that would benefit from fastener tension monitoring.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) associated with the processor may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the processor to perform various functions including, but not limited to, storing, processing and/or analyzing/comparing signals transmitted from sensors (e.g., the sensors 420 associated with each desired fastener), transmitting suitable control or notification signals/alarms to desired recipients and/or the like. In addition, the processor 440 may also include various input/output channels for receiving inputs from other sensors and/or other measurement devices and for sending control signals to various components of the wind turbine 10. The processor 440 may be located locally to the wind turbine (e.g., in the turbine controller housed in the nacelle) or remotely (e.g., at a nearby wind farm monitoring center or in a monitoring center in a different state or country). The processor 440 may also transmit a notification to a remote monitoring center, individual computer or handheld device (e.g., a mobile phone).

Figure 5:
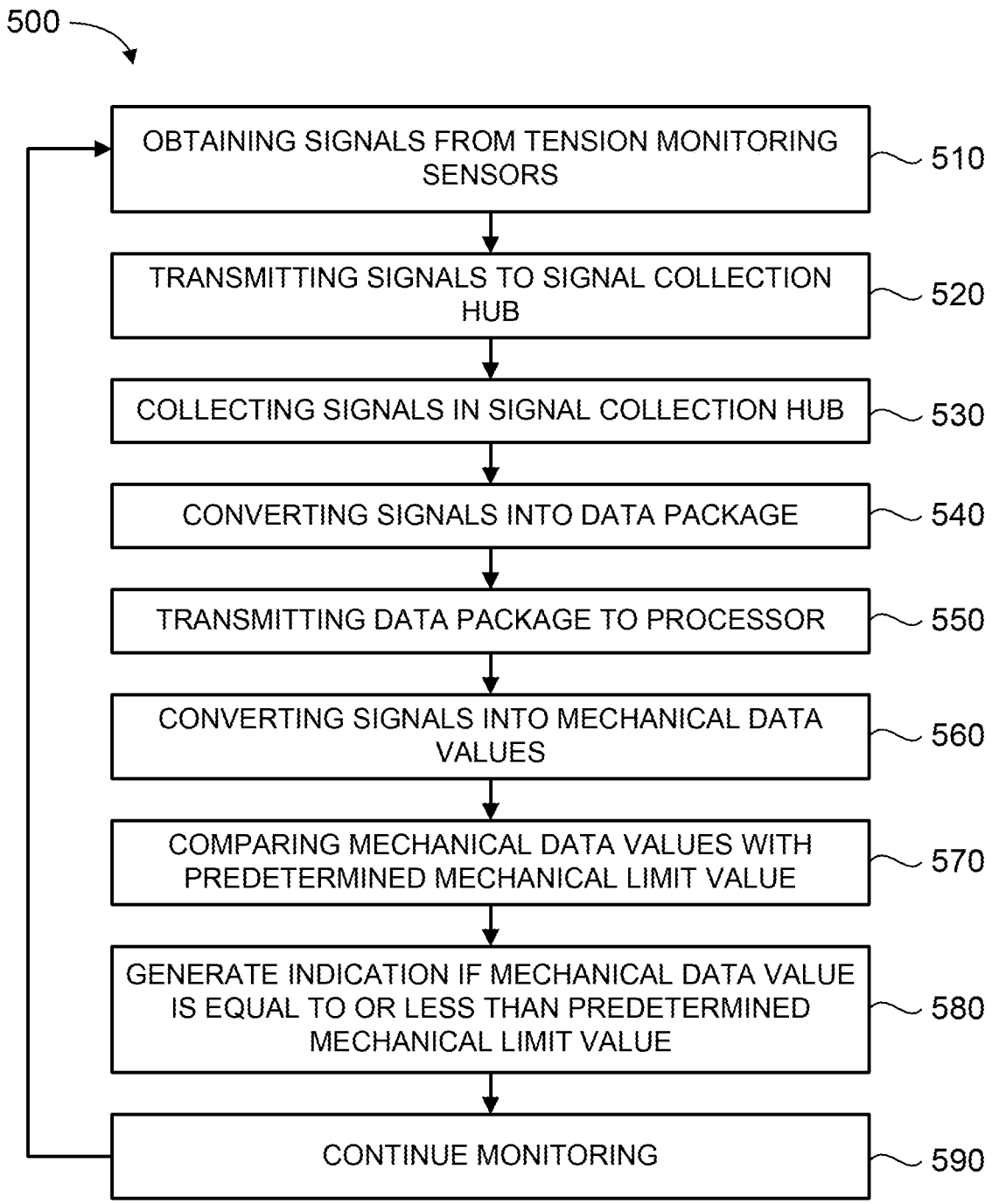
FIG. 5 is a flowchart of a method for monitoring fastener tension, according to an aspect of the disclosure.

FIG. 5 is a flowchart of a method 500 for monitoring fastener tension, according to an aspect of the disclosure. A fastener 410 clamps a first member 101 to a second member 40. It is to be understood that the fastener 410 may clamp multiple members together. The fastener 410 includes a nut 412 proximate to the second member 40 and a washer 414 interposed between the nut 412 and the second member 40. The method 500 includes an obtaining step 510 that obtains one or more signals from one or more load monitoring sensors 420. Each of the load monitoring sensors 420 are interposed between the washer 414 and the second member 40, although the load monitoring sensor can be interposed in between any of the members of the stack as may be desired in the specific application. Each of the load monitoring sensors 420 outputs a signal (e.g., a voltage signal) upon changes in fastener tension. A transmitting step 520 transmits the one or more signals to a signal collection hub 430. A collecting step 530 collects the one or more signals in the signal collection hub 430, and a converting step 540 converts the one or more signals into a data package. A data package is an aggregation of one or more signals. A transmitting step 550 transmits the data package to a processor 440. A converting step 560 converts the one or more signals with the processor 440 into mechanical data values. The mechanical data values are one or more tension values, and the predetermined mechanical limit value is a tension value at or below which the fastener should be re-tensioned or replaced. For example, the tension values may be measured in newtons or pounds. A comparing step 570, performed with the processor, compares the mechanical data values to a predetermined mechanical limit value. In step 580 an indication is generated if a value of the mechanical data values is equal to or less than the predetermined mechanical limit value. The indication is a notification that the fastener should be serviced.

The mechanical data values of step 560 may be calculated with the following equation:

$$F(t) = \frac{V * A}{g * t} \qquad \text{Equation 1}$$

In Equation 1 above, F(t) is the force value for a specific time and for a specific load monitoring sensor (or fastener). V is the voltage value received from the load monitoring sensor. A is the cross-sectional area of the piezoelectric material. "g" is a material coefficient which depends on piezoelectric sensor selection. "t" is the thickness of the piezoelectric material.

$$F^{fact}(t,r,m) = r * m * F(t) \qquad \text{Equation 2}$$

In equation 2 above, $F^{fact}$ is the factored force calculated in equation 1. "r" and "m" are adjustment factors depending on the specific application. The force value F(t) and $F^{fact}(t)$ are typically calculated in terms of newtons or pounds.

The comparing step 570 uses the results of Equation 2 above and compares the resulting values to a predetermined mechanical limit value. As one example only, the predetermined mechanical limit value may be 100 Newtons, so if the mechanical data values fall to 100 Newtons or below then an indication, notification or alarm is generated to alert a monitoring station that a specific fastener needs to be re-tensioned/torqued or replaced. The method 500 constantly monitors the fasteners and the steps 510-580 only occur when the load on a fastener changes. In no load change conditions, no voltage changes occur, so the method effectively stands by in a monitoring mode that waits for incoming signals from the load monitoring sensors.

The indication generated will identify the specific machine or wind turbine and the specific fastener that is a cause for concern. The specific indication generated may be an e-mail, text message or other analog or digital signal sent to a monitoring station or monitoring personnel. Each fastener is tracked over time, so a force vs. time chart can be viewed for each fastener. Multiple threshold levels can be set up to provide various warning levels, for example, a green level where the fastener is tensioned in a desired range, a yellow level where a fastener is approaching but has not yet reached a critical level and a red level where the fastener has tension levels below a critical level and needs to be re-tensioned to avoid compromised integrity. This type of multi-tiered notification level is very useful for remotely located machines (e.g., off-shore wind turbines, etc.) so that efficient use of service personnel's time is maximized. It may be difficult (and very time consuming) to physically inspect all the fasteners in a wind turbine's foundation, tower or rotor, so the system and method described herein facilitates the monitoring process and reduces machine down-time by correcting problems before they affect machine operation.

The system and method according to aspects disclosed herein may be used for monitoring one of a group of machines, a subset of machines or all the machines in a group. For example, in a wind farm one wind turbine may be monitored and the results (i.e. fastener tension below desired range/limit) of the fastener monitoring for a single wind turbine (or a small subset of wind turbines) may indicate that a larger group or all of the wind turbines should be checked to verify that the fastener tension is within desired specification ranges. Fasteners located in the tower (horizontal or vertical tower joints), tower foundation, spaceframe or lattice type towers, tower segment joints, blade to hub connection, nacelle components or any other suitable location may be monitored with the system and method disclosed herein.

A technical advantage of the present disclosure is that it allows the acquisition of real-time fastener/bolt tension data, and this data is used to accurately and efficiently schedule fastener service (e.g., re-torquing or re-tensioning) for one or multiple fasteners. The load monitoring sensors may be located in hard to reach/access locations for human service personnel, and permit constant monitoring as the machine does not need to be shut down during monitoring. In many instances a wind turbine needs to be shut down if service personnel are in or around the wind turbine for safety reasons. Therefore, another technical advantage of the present disclosure tis that the machine or wind turbine may be operational during fastener tension monitoring.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for monitoring fastener tension in a wind turbine, the system comprising:
   a fastener assembly clamping a first member to a second member, the fastener assembly comprising a fastener, a fastener head, a fastener body, a nut, and a washer, the fastener head adjacent to the first member such that the fastener body extends through the first and second members, the nut proximate to the second member, the washer interposed between the nut and the second member, wherein the first member and the second member are wind turbine parts or wind turbine foundation parts;
   a load monitoring sensor interposed between the nut and the second member, the load monitoring sensor outputting at least one electrical signal upon changes in fastener tension;
   a signal collection hub operatively connected to the load monitoring sensor so that the at least one electrical signal is transmitted from the load monitoring sensor to the signal collection hub, wherein the signal collection hub collects and converts the at least one electrical signal into a data package; and
   a processor operatively connected to the signal collection hub so that the data package is transmitted from the signal collection hub to the processor, wherein the processor transforms the data package into a digital representation of mechanical data, and wherein the mechanical data is compared to a predetermined mechanical limit value by the processor, and if a value of the mechanical data is equal to or less than the predetermined mechanical limit value, the processor generates an indication that the fastener should be serviced.

2. The system of claim 1, wherein the load monitoring sensor is a piezoelectric sensor.

3. The system of claim 1, wherein the load monitoring sensor is operatively connected to the signal collection hub via a wired link or a wireless link, or the signal collection hub is operatively connected to the processor via a wired link or a wireless link.

4. The system of claim 1, wherein the fastener assembly comprises a plurality of fasteners, each of the plurality of fasteners comprising a load monitoring sensor.

5. The system of claim 1, wherein the mechanical data is one or more tension values, and the predetermined mechanical limit value is a tension value at or below which the fastener should be re-tensioned, re-torqued or replaced.

6. A method for monitoring fastener tension, the method comprising:
   providing a fastener assembly that clamps a first member to a second member, the fastener assembly comprising a fastener, a fastener head, a fastener body, a nut, and a washer, the fastener head adjacent to the first member such that the fastener body extends through the first and second members, the nut proximate to the second member, the washer interposed between the nut and the second member, wherein the first member and the second member are wind turbine parts or wind turbine foundation parts;

obtaining one or more signals from a load monitoring sensor interposed between the nut and the second member, wherein a load monitoring sensor outputs a signal upon changes in fastener tension;

transmitting the signal to a signal collection hub;

collecting the signal in the signal collection hub;

converting the signal into a data package;

transmitting the data package to a processor;

converting the data package with the processor into mechanical data values;

comparing the mechanical data values to a predetermined mechanical limit value; and generating an indication if a value of the mechanical data values is equal to or less than the predetermined mechanical limit value, wherein the indication is a notification that the fastener should be serviced.

7. The method of claim 6, wherein the mechanical data is one or more tension values, and the predetermined mechanical limit value is a tension value at or below which the fastener should be re-tensioned, re-torqued or replaced.

8. The method of claim 7, wherein the first member and the second member are wind turbine parts or wind turbine foundation parts.

9. The method of claim 7, wherein each of the one or more load monitoring sensors is a piezoelectric sensor.

10. The method of claim 7, wherein the one or more load monitoring sensors transmit the signal to the signal collection hub via a wired link or a wireless link.

11. The method of claim 7, wherein the signal collection hub transmits the data package to the processor via a wired link or a wireless link.

12. A method for monitoring fastener tension in a wind turbine, the method comprising:

providing a fastener assembly that clamps a bolted joint of the wind turbine, the bolted joint comprising first and second members, the fastener assembly comprising a fastener with a fastener body comprising a proximal end and a distal end, a fastener head at the proximal end, a nut, and a washer, the fastener head adjacent to the first member such that the fastener body extends through the first and second members, the nut proximate to the second member, the washer interposed between the nut and the second member, the nut and washer secured to the distal end of the fastener body, wherein the first member and the second member are wind turbine parts or wind turbine foundation parts;

obtaining one or more signals from one or more load monitoring sensors, the one or more load monitoring sensors being placed around a portion of the fastener, the one or more load monitoring sensors outputs a signal upon changes in fastener tension;

transmitting the signal to a signal collection hub;

converting the signal into a data package;

transmitting the data package to a processor;

converting the data package with the processor into mechanical data values;

comparing the mechanical data values to a predetermined mechanical limit value;

generating an indication if a value of the mechanical data values is equal to or less than the predetermined mechanical limit value, wherein the indication is a notification that the fastener should be serviced.

13. The method of claim 12, wherein the signal collection hub collects the signal and subsequently converts the signal into the data package.

14. The method of claim 12, wherein the mechanical data is one or more tension values, and the predetermined mechanical limit value is a tension value at or below which the fastener should be re-tensioned, re-torqued or replaced.

15. The method of claim 12, wherein the bolted joint fastens a tower of the wind turbine to a supporting surface.

16. The method of claim 12, wherein the bolted joint fastens joints in a tower, tower section, hub, rotor or nacelle of the wind turbine.

17. The method of claim 12, wherein each of the one or more load monitoring sensors is a piezoelectric sensor.

18. The method of claim 12, wherein the one or more load monitoring sensors transmit the signal to the signal collection hub via a wired link or a wireless link, or the signal collection hub transmits the data package to the processor via a wired link or a wireless link.

19. The method of claim 12, wherein multiple fasteners are monitored and the multiple fasteners are separated into groups, and each of the groups have a different predetermined mechanical limit value.

* * * * *